(12) United States Patent
Diab

(10) Patent No.: US 7,975,153 B2
(45) Date of Patent: *Jul. 5, 2011

(54) TRANSMISSION IMPEDANCE FOR FOUR-PAIR MIDSPAN POWERING IN A POWER OVER ETHERNET APPLICATION

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 659 days.

This patent is subject to a terminal disclaimer.

(21) Appl. No.: 11/860,598

(22) Filed: Sep. 25, 2007

(65) Prior Publication Data

US 2009/0083549 A1 Mar. 26, 2009

(51) Int. Cl.
*G06F 1/26* (2006.01)
(52) U.S. Cl. .......................................... 713/300; 710/62
(58) Field of Classification Search .................. 713/300; 710/62

See application file for complete search history.

(56) References Cited

U.S. PATENT DOCUMENTS

| 7,057,899 B2 | 6/2006 | AbuGhazaleh et al. |
| 7,474,704 B2 * | 1/2009 | Lum et al. ..................... 375/257 |
| 7,778,409 B2 * | 8/2010 | Karam ........................... 379/413 |
| 2005/0197094 A1 | 9/2005 | Darshan et al. |
| 2006/0078093 A1 | 4/2006 | Karam et al. |
| 2006/0092826 A1 * | 5/2006 | Karam et al. .................. 370/216 |
| 2007/0077819 A1 * | 4/2007 | Thomson et al. ......... 439/620.01 |

FOREIGN PATENT DOCUMENTS

WO  WO 2006/052360 A1  5/2006

OTHER PUBLICATIONS

David Law and Wael William Diab, "100BASE-T normative 350uH inductance specification and IEEE P802.3at," IEEE P802.3at DTE Power Enhancements Task Force, Jul. 16-19, 2007.

* cited by examiner

*Primary Examiner* — Albert Wang
(74) *Attorney, Agent, or Firm* — Duane S. Kobayashi

(57) ABSTRACT

A midspan power sourcing equipment (PSE) for operation with power over Ethernet (PoE). The midspan PSE provides powering over wire pairs that are also used for data communication. To ensure compatibility with legacy Ethernet devices, the ports used for transmission of data are designed with a low effective impedance at a frequency of operation.

5 Claims, 6 Drawing Sheets

TRANSMISSION IMPEDANCE FOR FOUR-PAIR MIDSPAN POWERING IN A POWER OVER ETHERNET APPLICATION

BACKGROUND

1. Field of the Invention

The present invention relates generally to Power over Ethernet (PoE) and, more particularly, to transmission impedance for midspan powering in a PoE application.

2. Introduction

The IEEE 802.3af and 802.3at PoE specifications provide a framework for delivery of power from power sourcing equipment (PSE) to a powered device (PD) over Ethernet cabling. In this framework, various PDs can be deployed such as voice over IP (VoIP) phones, wireless LAN access points, network cameras, computing devices, etc.

In the PoE process, a valid device detection is first performed. This detection process identifies whether or not it is connected to a valid device to ensure that power is not applied to non-PoE capable devices. After a valid PD is discovered, the PSE can optionally perform a Layer 1 power classification.

In one configuration, power can be sourced directly from data terminal equipment such as an Ethernet switch. This type of network device is referred to as an endspan device. In another configuration, power can be supplied by a midspan device. FIG. 1 illustrates such a midspan configuration, which includes a medium dependent interface (MDI) link between Ethernet switch 110 and PD 130. Midspan configurations can be used for various systems such as 100BASE-TX and 1000BASE-T systems. As illustrated, midspan PSE 120 is placed in the middle of the MDI link for the insertion of power to be supplied to PD 130. An advantage of such a midspan configuration is the usage of legacy Ethernet switches that do not have PoE capabilities.

In one midspan configuration that supports 100BASE-TX, data is transmitted using pins 1 (TX+), 2 (TX−), 3 (RX+), and 6 (RX−) of the Ethernet cable. The remaining pins 4, 5, 7, and 8, which are representative of the two unused pairs of the Ethernet cable, can be used by midspan PSE 120 for the transmission of power to PD 130. In an alternative midspan configuration, power is not transmitted on the two unused pairs, but transmitted on the two signal pairs used for data transmission.

Midspan PSE design guidelines have not been tightly specified beyond a general recognition that the cabling channel performance should be maintained by the midspan PSE when it is inserted into an MDI link. What is needed therefore is a mechanism that ensures that a midspan PSE maintains proper compatibility with various network elements such as legacy Ethernet devices.

SUMMARY

Transmission impedance for midspan powering in a PoE application, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
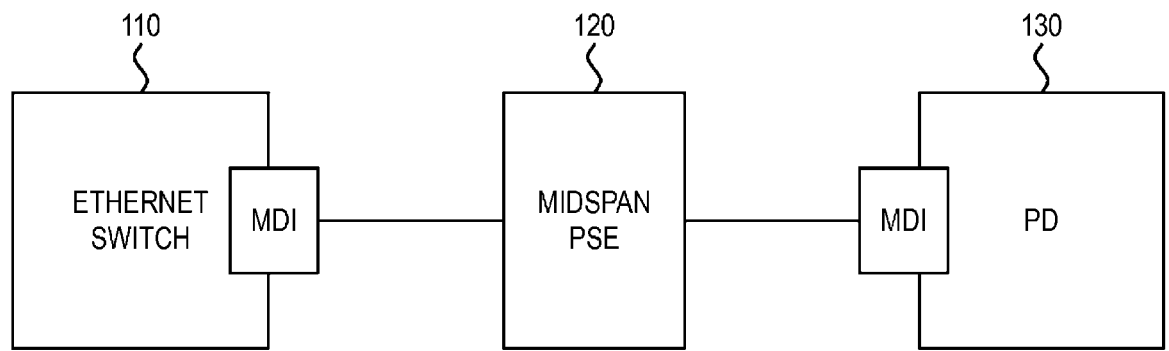
FIG. 1 illustrates an example of the inclusion of a midspan PSE in an MDI link.
Figure 2:
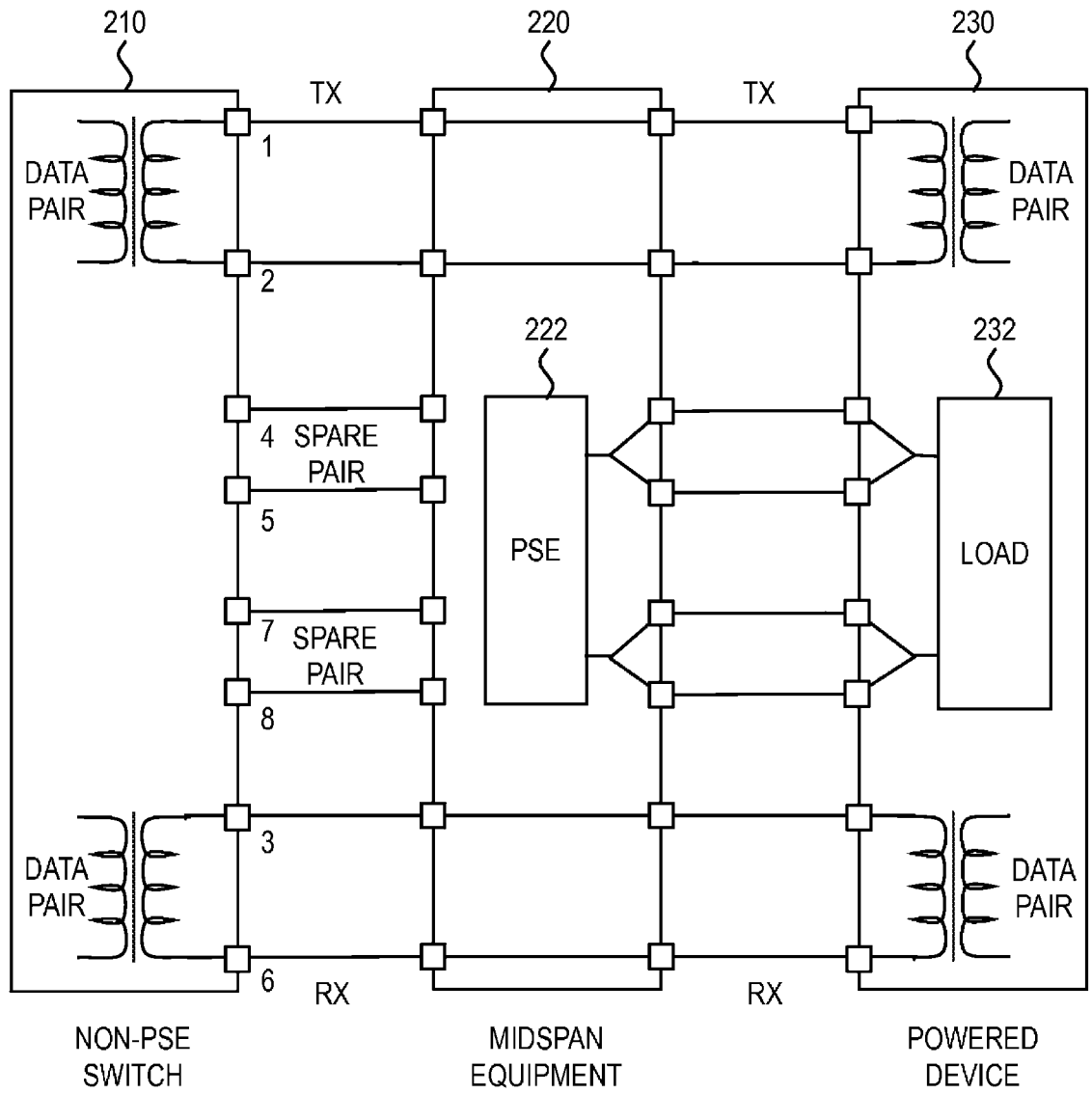
FIG. 2 illustrates an embodiment of powering a PD by midspan equipment using unused wire pairs.

As noted, one type of midspan PoE configuration can be designed to use the two unused wire pairs for the transmission of power to the PD (referred to as Alternative B). FIG. 2 illustrates an example of such a midspan configuration. As illustrated, the two unused wire pairs are terminated at midspan equipment 220. The remainder of the link of the two unused wire pairs is then used to transmit power from PSE 222 to PD 230. As power is inserted onto the link by midspan equipment 220, Ethernet switch 210 need not have PoE capabilities. Ethernet switch 210 can therefore represent legacy Ethernet equipment. In general, a PD is capable of receiving power from either wire pair in 802.3af and two-pair powering in 802.3at.

In a four-pair Ethernet cable, two signal wire pairs can be used for data transmission. In one implementation such as 100BASE-TX, pins 1 (TX+) and 2 (TX−) are used for the transmission (TX) portion of the link, while pins 3 (RX+) and 6 (RX−) are used for the receiving (RX) portion of the link. Pins 4, 5, 7, and 8 represent the two unused wire pairs, which are not used in the portion of the link between Ethernet switch 210 and midspan equipment 220.

At midspan equipment 220, power is inserted using PSE 222. Specifically, PSE 222 provides power to PD 230 using the two unused wire pairs (pins 4, 5, 7, and 8), which are terminated at midspan equipment 220. The power carried on the two unused wire pairs is then extracted at PD 230 to power load 232.

As further illustrated in FIG. 2, the two signal wire pairs used for data transmission (pins 1, 2, 3, and 6) are passed through midspan equipment 220 onto PD 230. This pass-through connection can be implemented as an undisrupted channel connection between Ethernet switch 210 and PD 230. In other words, the characteristics of the wired channel connection between Ethernet switch 210 and PD 230 can be left largely undisturbed as the data transmissions pass through midspan equipment 220.

Figure 3:
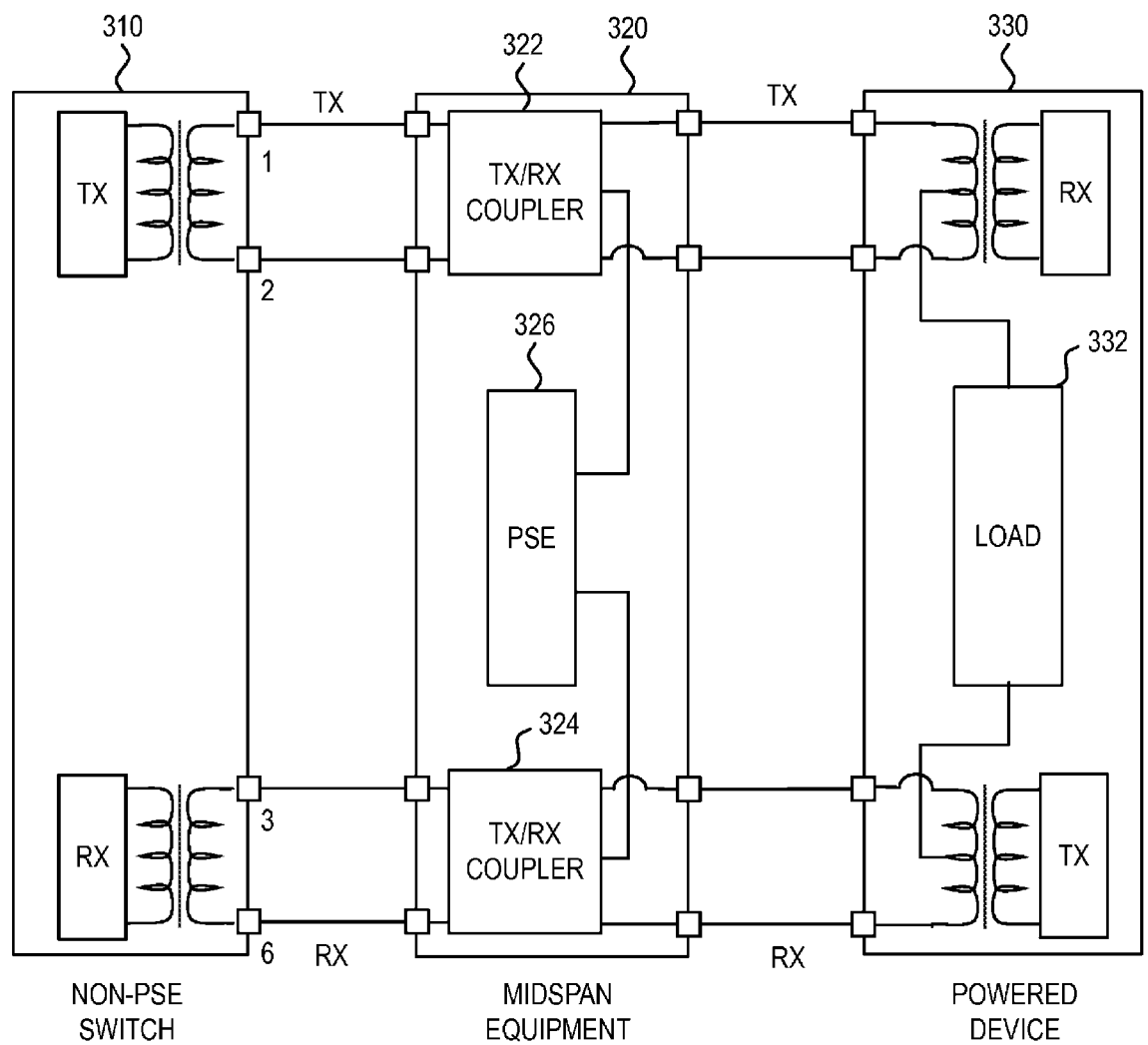
FIG. 3 illustrates an embodiment of powering a PD by midspan equipment using the data transmission signal wire pairs.

FIG. 3 illustrates an alternative midspan powering configuration that uses the two data transmission signal wire pairs for powering, instead of the two unused wire pairs. Thus, in the context of the example of FIG. 2, the two signal wire pairs represented by pins 1, 2, 3, and 6 can be used for both data transmission and powering. In this alternative midspan powering scheme, the channel connection between Ethernet switch 310 and PD 330 is disturbed to accommodate the insertion of power by PSE 326.

Consider, for example, the signal wire pair represented by pins 1 and 2. In this signal wire pair, data is transmitted from Ethernet switch 310 and received at midspan equipment 320. After passing through transmit/receive (TX/RX) coupler 322, the data is then transmitted to PD 330. Similarly, for the signal wire pair represented by pins 3 and 6, data that is transmitted by PD 330 is received at midspan equipment 320. After passing through TX/RX coupler 324, the data is then transmitted on to Ethernet switch 310. In one conventional midspan equipment example, the TX/RX couplers are embodied using a magnetic element such as a transformer.

The disruption in the channel connection between Ethernet switch 310 and PD 330 allows for the application of DC power on a side of the TX/RX coupler that is isolated from the other side. The transmitted power can then be extracted at PD 330 through the taps of the corresponding transformers in PD 330. The extracted power is then used to drive load 332.

One of the consequences of having a disrupted channel connection between Ethernet switch 310 and PD 330 is the impact on the end-to-end channel connection. In a non-disrupted channel connection, only a single transformer pair is used at the two ends of the link (i.e., Ethernet switch 310 and PD 330). When a disruption occurs at the midspan equipment, two separate segments in the link are created. On the transmit side, a first segment is represented by the transmission transformer in switch 310 and a first side of TX/RX coupler 322, and a second segment is represented by the second side of TX/RX coupler 322 and the receiving transformer in PD 330.

In the present invention, it is recognized that the conventional inclusion of a transformer as TX/RX couplers in midspan equipment 320 can lead to mismatches between a transmitter and receiver. For example, consider the inductance requirement that is specified by the 100BASE-TX specification for the transmit side. As the 100BASE-TX specification sets forth, the minimum inductance measured at the transmit pins shall be greater than or equal to 350 µH with any DC bias current between 0-8 mA injected. As would be appreciated, other inductance ranges (higher or lower) can also be specified for a given application. For example, a higher inductance range can be specified to accommodate higher DC bias currents that would be expected in an application such as 802.3at. In general, the specification of a minimal inductance in a transformer on the transmit side is designed to ensure compatibility with PHY receivers (e.g., 100BASE-TX) that expect to see the effective inductance on the channel such that the signal quality and BER of the link is not impacted.

In an undisrupted channel connection between Ethernet switch 310 and PD 330, this requirement can be met by the inclusion of a transmitter transformer at Ethernet switch 310 that presents at least 350 µH at the transmit pins. This minimum inductance level can be specified to present sufficient inductance that would overcome killer patterns that cause baseline wander so that the receiver can recover. In other words, the inductor at the source slows down the edges.

For channel connections that are disrupted at midspan equipment 320, however, this transmitter transformer inductance characteristic would not apply to far end PD 330. Rather, the performance experienced by the receiver in far end PD 330 would be dictated by the characteristics of the side of TX/RX coupler 322 that was facing PD 330. If the PD side of TX/RX coupler 322 is not properly designed, then the bit error rate (BER) can increase to unacceptable levels due to baseline wander. This issue is especially problematic when dealing with legacy equipment that does not have compensated physical layer devices (PHYs) at the receiving end.

It is therefore a feature of the present invention that the midspan equipment is designed to ensure compatibility with all legacy equipment whether or not power is inserted by the midspan equipment onto the two data transmission signal wire pairs. In one embodiment, this compatibility is enabled through the inclusion of a TX/RX coupler having a low effective impedance at a frequency range of interest (e.g., operation frequency for 100BASE-TX). By including such a TX/RX coupler design at the midspan equipment, powering on the signal wire pairs would present a sufficiently low impedance at the frequency range of operation, thereby preventing issues such as baseline wander. As would be appreciated, this effect would be felt regardless of the level of inductance in the transformer at the switch.

Figure 4:
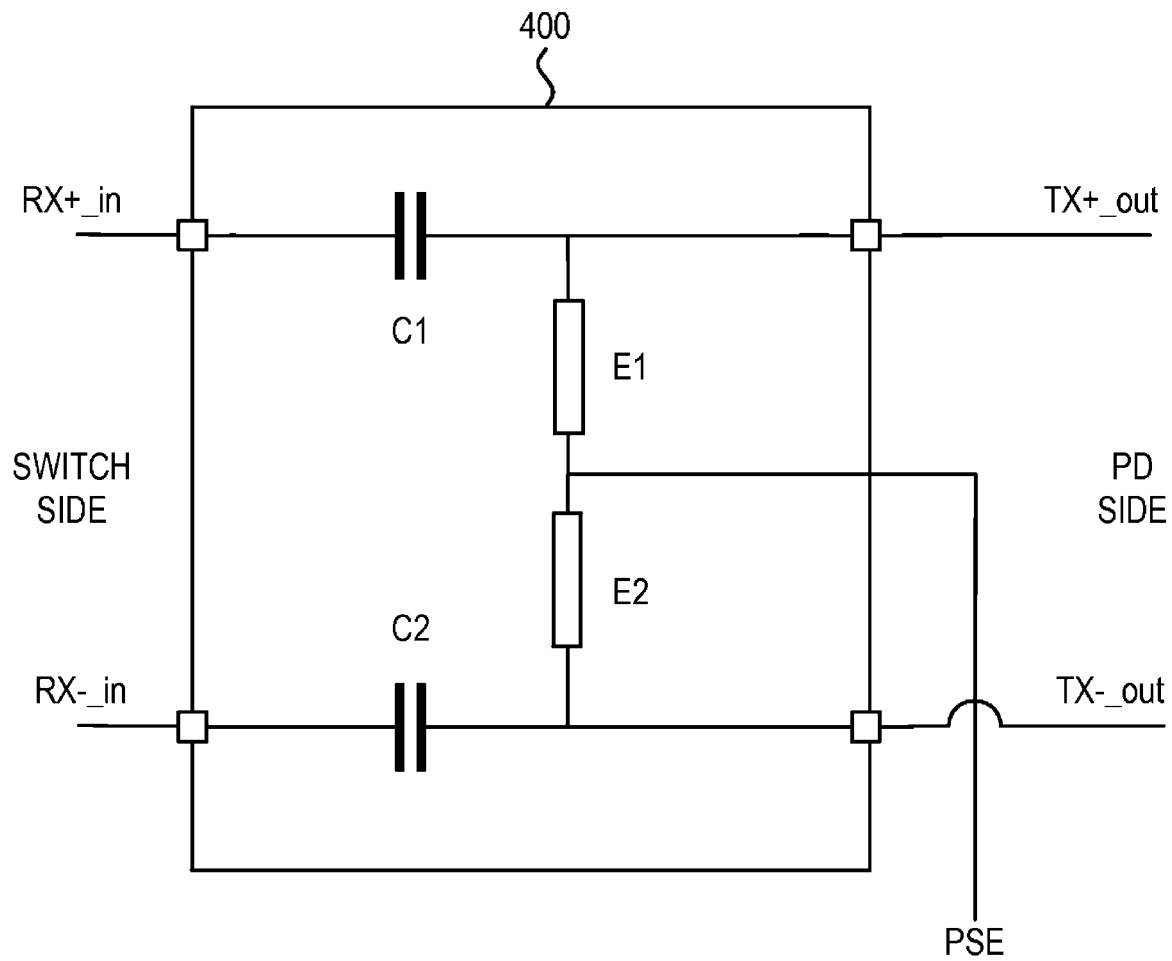
FIG. 4 illustrates an embodiment of a transmitter/receiver coupler according to the present invention.

FIG. 4 illustrates a simple example embodiment of a TX/RX coupler according to the present invention. As illustrated, TX/RX coupler 400 includes blocking capacitors C1, C2 that enables DC isolation between the two sides of TX/RX coupler 400. On the PD side of TX/RX coupler 400, elements E1, E2 are designed to create a low impedance effect at the frequency range of interest. As would be appreciated, the particular inclusion of resistive, capacitive, and/or inductive components in elements E1, E2 would be implementation dependent. Here, it is significant that the PD side of TX/RX coupler 400 would appear as the far end of the link to a legacy receiving PHY at the PD. In general, the midspan equipment design on the transmit side is critical for ensuring proper compatibility with legacy equipment.

The midspan equipment design of the present invention enables the support of legacy PHYs on either end of the link. The legacy PHY can be included in either the switch or the PD. As such, the inclusion of a midspan TX/RX coupler having a low effective impedance at a frequency of operation enables the support of legacy Ethernet switches and PDs. In general, the principles of the present invention places an increased design constraint on midspan equipment. This is in contrast to conventional midspan equipment designs that are designed to insert power onto the two unused wire pairs. For those applications, no requirement for the transmitter transformers would be necessary as data communication and powering would occur on separate sets of wire pairs.

Figure 5:
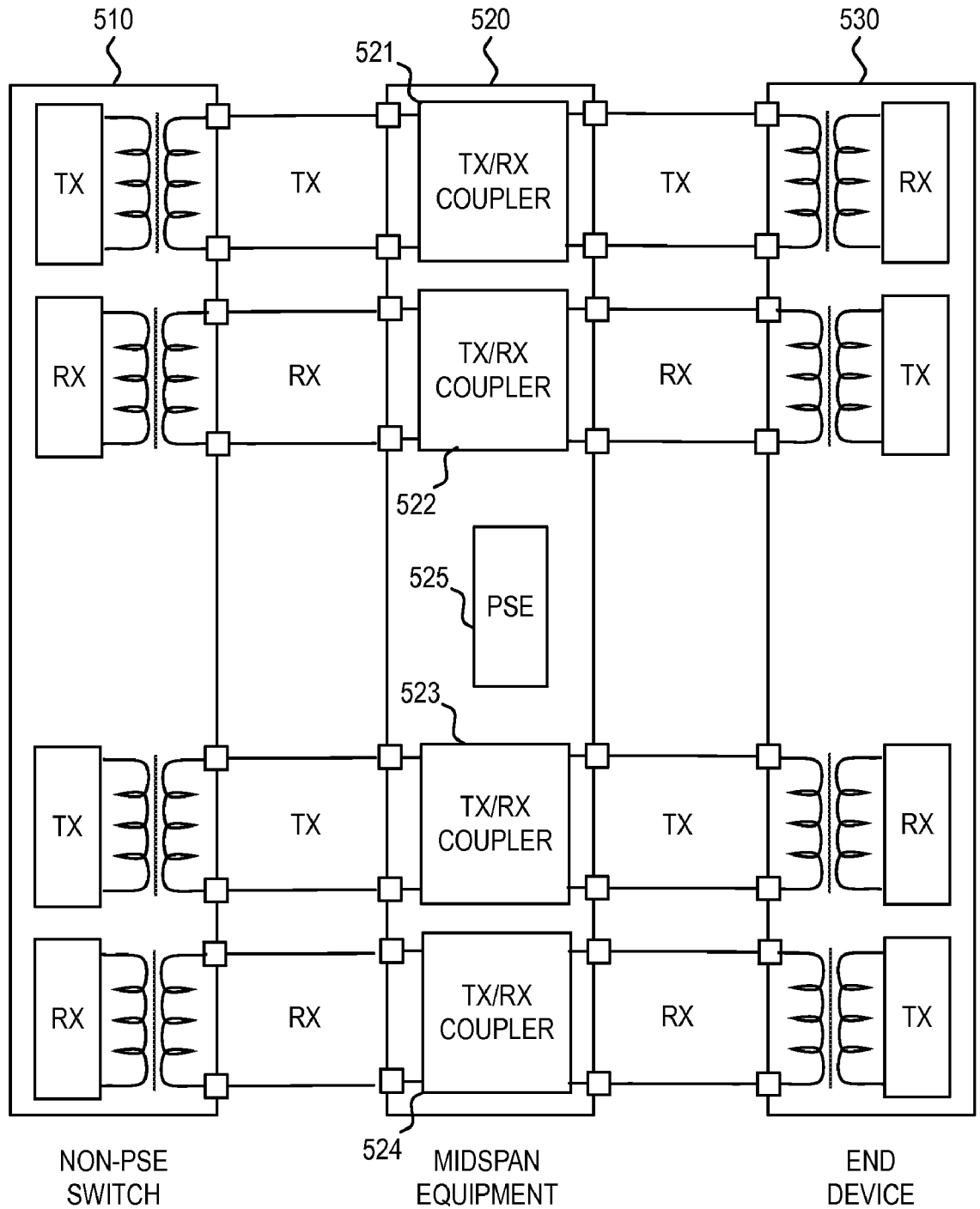
FIG. 5 illustrates an embodiment of a midspan equipment that applies to data transmission using four wire pairs.

FIG. 5 illustrates another midspan embodiment that can benefit from the principles of the present invention. In this embodiment, the midspan equipment is designed to inject power into a link that uses all four wire pairs for data transmission (e.g., 1000BASE-T). As illustrated, four TX/RX couplers 521-524 are included in midspan equipment 520. These four TX/RX couplers 521-524 can be designed to replace four data transformers, thereby generating significant cost savings. While the power connections are not shown, PSE 525 can be designed to inject power into one or both (e.g., 802.3at) of the two wire pair groupings. Specifically, power can be injected through TX/RX couplers 521, 522 and/or through TX/RX couplers 523, 524.

Figure 6:
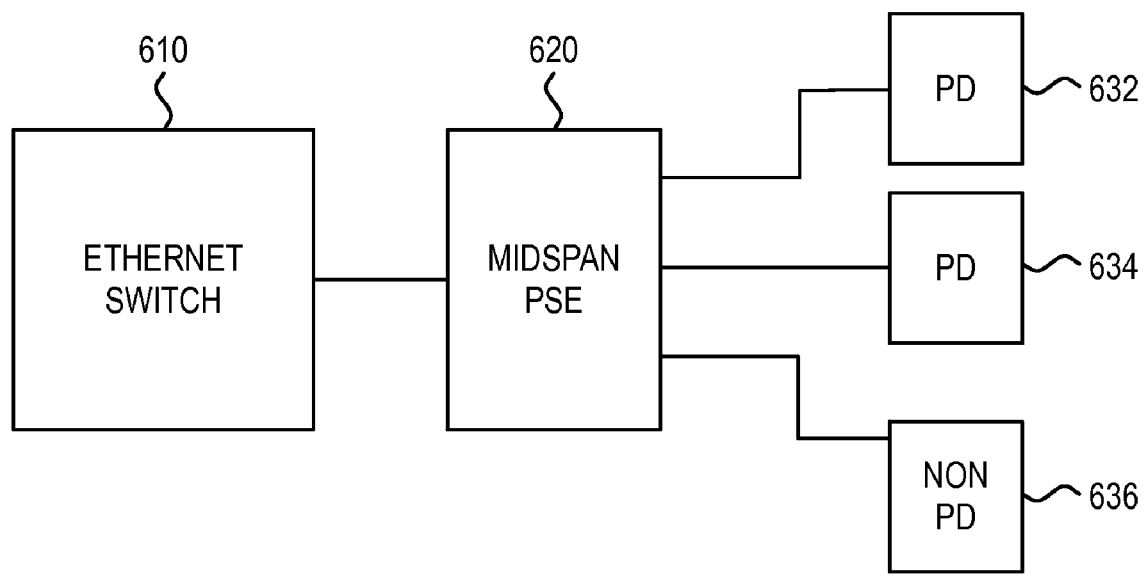
FIG. 6 illustrates an example of the support of non-PDs by midspan equipment.

As would be appreciated, the principles of the present invention would apply regardless of whether power was applied to the signal wire pairs. In one scenario, the midspan equipment design can also support non-PD devices that have legacy PHYs. These non-PD devices would not receive power since they would not be discovered as valid PD devices. FIG. 6 illustrates an example of such a scenario where PDs 632, 634 and non-PD 636 are supported by midspan PSE 620. Here, each of PDs 632, 634 and non-PD 636 can be a link partner that is attached to midspan PSE 620 and switch 610. If a TX/RX coupler in midspan PSE 620 is designed with a low effective impedance at the frequency of operation, then midspan PSE 620 can support a legacy PHY in non-PD 636, regardless of whether Ethernet switch 610 could present an appropriate inductance level.

Finally, the principles of the present invention can also be applied to medium dependent interface crossover (MDIX) ports.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A midspan power sourcing equipment for four pair powering of a powered device, comprising:
    a first port coupled to a first wire pair that is connected to a powered device;
    a second port coupled to a second wire pair that is connected to said powered device, wherein said first and second wire pairs are respectively used for transmission and reception of data;
    a third port coupled to a third wire pair that is connected to said powered device;
    a fourth port coupled to a fourth wire pair that is connected to said powered device;
    a power source that provides power to said powered device using said first, second, third, and fourth wire pairs simultaneously, wherein said first port is configured to present a low effective impedance at a frequency of operation that enables operation with a receiving physical layer device that does not compensate for baseline wander.

2. The midspan power sourcing equipment of claim 1, wherein all of said ports present said low effective impedance.

3. The midspan power sourcing equipment of claim 1, wherein said first port is coupled to a transmit/receive coupler having blocking capacitors.

4. The midspan power sourcing equipment of claim 1, wherein said data transmission conforms to 100BASE-TX.

5. The midspan power sourcing equipment of claim 1, wherein said data transmission conforms to 1000BASE-T.

* * * * *